United States Patent [19]
Halamish et al.

[11] Patent Number: 5,762,090
[45] Date of Patent: Jun. 9, 1998

[54] OVER FILLING VALVE

[75] Inventors: Asaf Halamish, Karkur; Avi Zakai, Zichron Yacov, both of Israel

[73] Assignee: Aran Engineering Development Ltd., Kfar Shmaryahu, Israel

[21] Appl. No.: 596,615

[22] Filed: Feb. 5, 1996

[30] Foreign Application Priority Data

Aug. 16, 1995 [IL] Israel ......................... 114959

[51] Int. Cl.$^6$ ..................................... F16K 24/04
[52] U.S. Cl. .................. 137/43; 137/45; 137/202
[58] Field of Search .................. 137/43, 45, 202

[56] References Cited

U.S. PATENT DOCUMENTS

| | | | |
|---|---|---|---|
| 4,991,615 | 2/1991 | Szlaga et al. | 137/202 X |
| 5,313,977 | 5/1994 | Bergsma et al. | 137/43 |
| 5,605,175 | 2/1997 | Bergsma et al. | 137/43 X |

FOREIGN PATENT DOCUMENTS

| | | |
|---|---|---|
| 0 724 098 | 7/1996 | European Pat. Off. . |
| 4-201720 | 7/1992 | Japan ......................... 137/202 |

*Primary Examiner*—Gerald A. Michalsky
*Attorney, Agent, or Firm*—Helfgott & Karas, PC

[57] ABSTRACT

An over filling interdiction valve, fitted within a fluid tank, the valve comprising a housing furnished with a first fluid inlet at a bottom end thereof and a first fluid outlet at top end thereof, a float member located within the housing and being displaceable along its longitudinal axis between the first inlet and the first outlet. The float member comprises at its bottom end a second fluid inlet and near its top end a second fluid outlet. Sealing means are associated at a top end of the float member for sealing the first fluid outlet and biasing means are provided within the housing for biasing the float member towards the first fluid outlet. The arrangement being such that the biasing means together with buoyancy forces acting on the float member tend to urge the float member to a sealing position in which the sealing means sealingly engage with the first fluid outlet, whilst gravity forces acting on the float member tend to displace the float member away from the first fluid outlet to an unsealed position. The valve further comprises means for restricting fluid ingress into the float member, wherein raising of the fluid level in the tank results in rise of the fluid level within the housing, as a consequence of which the float member is urged to the sealing position.

11 Claims, 9 Drawing Sheets

OVER FILLING VALVE

FIELD OF INVENTION

The present invention is in the field of over filling interdiction (OFI) valves. Such valves are designed to allow, on the one hand, venting of fuel vapor from a vehicle fuel tank and, on the other hand, to ensure the closure of the valve so as to prevent fuel from escaping from the tank through the OFI. Escape of fuel would occur due to over filling of fuel, or change of position of the tank, (e.g. when the vehicle rolls over or at extreme inclination thereof), or by a fuel wave (e.g. at sudden acceleration).

BACKGROUND OF THE INVENTION

OFI valves have long been known and are typically positioned at the uppermost portion of the fuel tank. One type of such valves consists of a caged float, displaced between an uppermost position in which it seals a vented outlet opening and between a lower position in which said opening is unsealed. According to this arrangement, the float follows the level of the fuel, whereby when the tank is not levelled or over filled, the outlet is sealed by the float.

A serious drawback of such a valve is that in case of pressure built up in the tank (e.g. by overheating) the pressure will cause the float to seal said outlet rather than vent it, resulting in further pressure built up. Another drawback of this valve is that in case of fuel overfilling, the float will remain in its sealing position as long as the fuel exceeds a predetermined level, again resulting in pressure built up within the tank, which in extreme cases may even be hazardous.

A second type of OFI valves belongs to the so-called normally closed type valve in which the fuel tank comprises at a top portion thereof an outlet opening sealable from above by a sealing mass member of a predetermined weight. The arrangement is such that when pressure builds up within the tank, said sealing member is displaced from its sealing position until the pressure drops down. In case of fuel overfill, the outlet opening remains sealed under weight of the sealing member as long as the pressure is within a predetermined range.

The disadvantage of this valve is that it does not provide a solution in case of roll over. Furthermore, it requires a predetermined minimal pressure to open.

It is preferable that an OFI valve be suitable also for venting the fuel tank, i.e releasing vacuum being built-up in the fuel tank owing to the engine sucking fuel from the fuel tank. However, most heretofore OFI valves do not comprise provisions for venting discharging vacuum.

It is the object of the present invention to provide a new and improved over filling interdiction valve, wherein the above-referred to disadvantages are substantially reduced.

BRIEF SUMMARY OF THE INVENTION

According to the present invention, there is provided an over filling interdiction valve, fitted within a fluid tank, the valve comprising:

a housing furnished with a first fluid inlet at a bottom end thereof and a first fluid outlet at top end thereof; a float member located within said housing and being displaceable along its longitudinal axis between said first inlet and said first outlet; said float member comprising at a bottom end thereof a second fluid inlet and near a top end thereof a second fluid outlet; sealing means associated at a top end of said float member for sealing said first fluid outlet; biasing means located within the housing and biasing the float member towards said first fluid outlet; whereby said biasing means together with buoyancy forces acting on the float member tend to urge said float member to a sealing position in which said sealing means sealingly engage with said first fluid outlet, whilst gravity forces acting on said float member tend to displace the float member away from said first fluid outlet to an unsealed position; means for restricting fluid ingress into the float member; wherein raising of the fluid level in the tank results in rise of the fluid level within said housing, as a consequence of which the float member is urged to said sealing position.

According to a preferred embodiment of the present invention said second fluid inlet is sealed by a displaceable sealing member constituting said restricting means, whereby acceleration or inclination of the fluid tank above a predetermined value causes displacement of the sealing means to unseal said second fluid inlet resulting in a rise of fluid within the float member which decreases the buoyancy of the float member, allowing it to overcome the biasing effect of said biasing means and move it to the unsealed position.

By a first application of the preferred embodiment, said second fluid inlet is a cylindrical opening, and the fluid ingress restricting means is a spherical member displaceable within the float member and having a diameter larger than the diameter of the cylindrical opening, wherein the spherical member is adapted for sealing engagement of said opening.

In a specific application, a top face of the bottom end of the float member has a conical cross-section, the lowermost portion being adjacent the opening. The minimal rate of inclination required for displacing the spherical member is in the range of 3° to 20°, a preferred value being in the range of 8°.

In accordance with another application of the invention the displaceable sealing member is constituted by a mass depending from a rigid sealing member adapted for sealing the second fluid inlet; the mass being rigidly suspended from the sealing member, whereby angular displacement of the mass entails angular displacement of the rigid sealing member.

By a second embodiment of the present invention, said second fluid inlet is an essentially narrow opening thereby constituting the fluid ingress restricting means, whereby rise of the fluid level within said housing brings about a restrained rise of fluid within the float member which gradually decreases the buoyancy of the float member, eventually allowing it to overcome the biasing effect of said biasing means and move it to the unsealed position.

The arrangement according to the second embodiment being such that in case of over filling, the OFI valve closes for a predetermined period of time and then spontaneously opens, regardless of the fuel level within the tank. However, in case of roll over or steep inclination, the valve is sealed owing to the biasing effect of the biasing means.

In accordance with an application of the invention, said biassing means is a compression spring bearing at a bottom end thereof against a top surface of base member of said housing, and at a top end thereof against a bottom surface of a base member of said float member.

In accordance with a specific application of the second application, the size of said second fluid inlet and said second fluid outlet ensure that in an essentially vertical position of the valve, after a predetermined period of time, the float member moves from the sealing position to the unsealing position, regardless of the fluid level in the tank.

According to an application of the invention, said first fluid outlet comprises a substantially elongated slit-like outlet aperture and said sealing means is an elongate flexible closure membrane strip, anchored at one end thereof to the top end of said float member and wherein said outlet aperture is bounded by a seal seat inclined with respect to said longitudinal axis and said surface is substantially equally inclined with respect to said axis; said housing and said float member are substantially coaxial and said float member is prevented from rotating within said housing.

With an OFI valve according to the invention, the provision of an elongated slit-like outlet aperture, together with a flexible membrane strip ensures that the opening forces effective on the valve are such as progressively to detach the strip from sealing engagement with the outlet. In this way it is ensured that the valve opens readily and effectively when required, without the necessity for the provision of additional, complicated mechanical means to this end.

In accordance with still another application of the invention, said first fluid outlet has a neck portion with a wider lower portion adapted for sealingly receiving a tapering projection from the top surface of the float member, whereby engagement of the tapering portion within the neck portion seals said first fluid outlet.

BRIEF DESCRIPTION OF THE DRAWINGS

For better understanding, the invention will now be described in a non-limiting way, with reference to the accompanying drawings, in which.

DETAILED DESCRIPTION OF THE INVENTION

Figure 1:
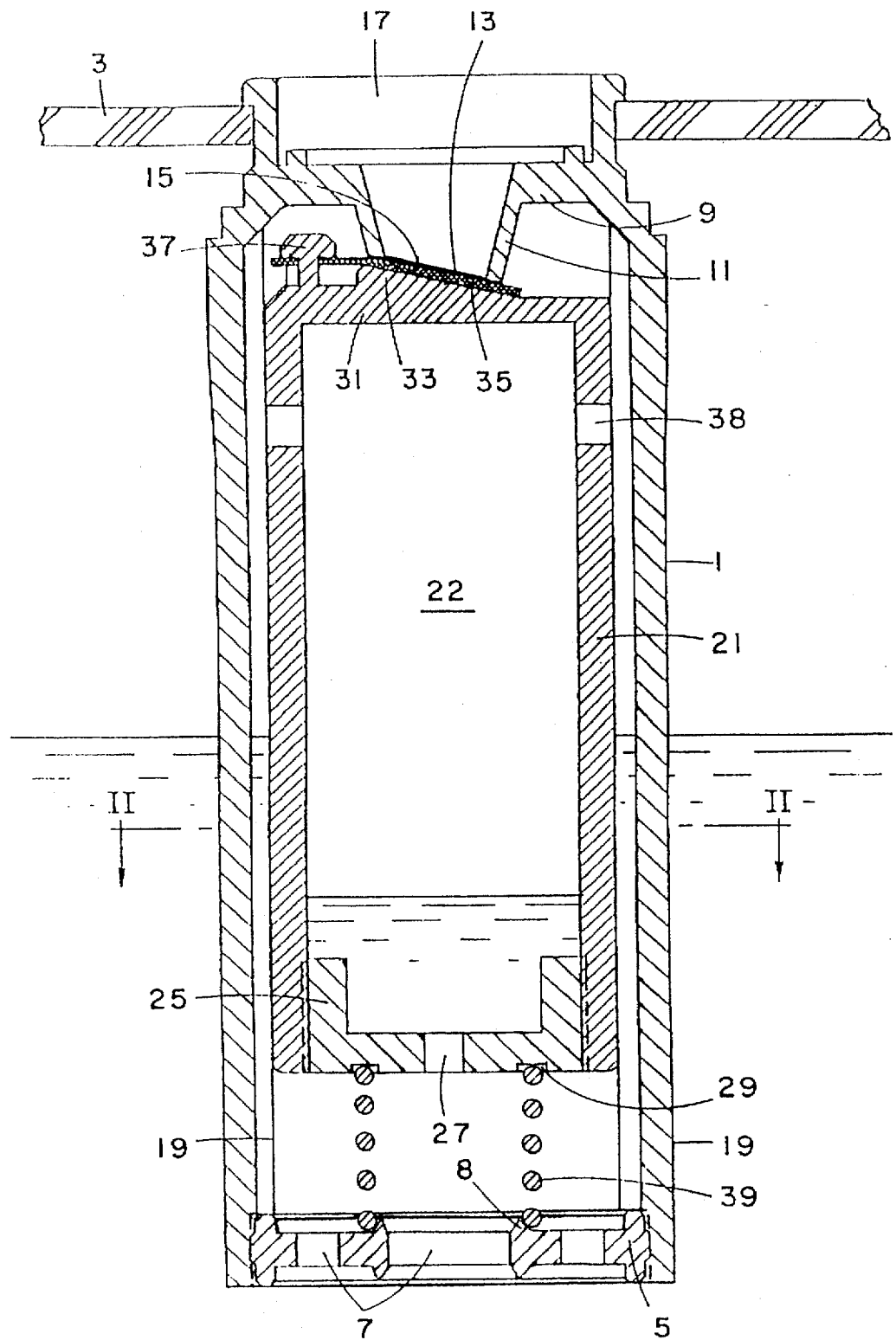
FIG. 1 is a longitudinal cross-sectional view of an over filling interdiction valve according to the present invention, the sealing means shown in a sealed/closed position.

Attention is first directed to FIG. 1 of the drawings in which an OFI valve comprises a housing 1 mounted within an opening at a topmost portion of the fuel tank 3.

The housing 1 is screw-fitted with a base member 5 in which are formed a plurality of openings 7 and an annular ridge 8 projecting from its top surface. At an upper end of the housing 1 there is formed a flanged member 9 having a downwardly dependent outlet funnel 11 formed with an inclined lowermost rim 13 which defines an inclined, elongated slit-like outlet 15, with the rim 13 constituting a valve seating. The outlet funnel 11 leads to the valve outlet 17 formed at the top of the housing 1, which valve outlet 17 is vented by a vent line (seen in FIG. 3), as known per se.

Figure 2:
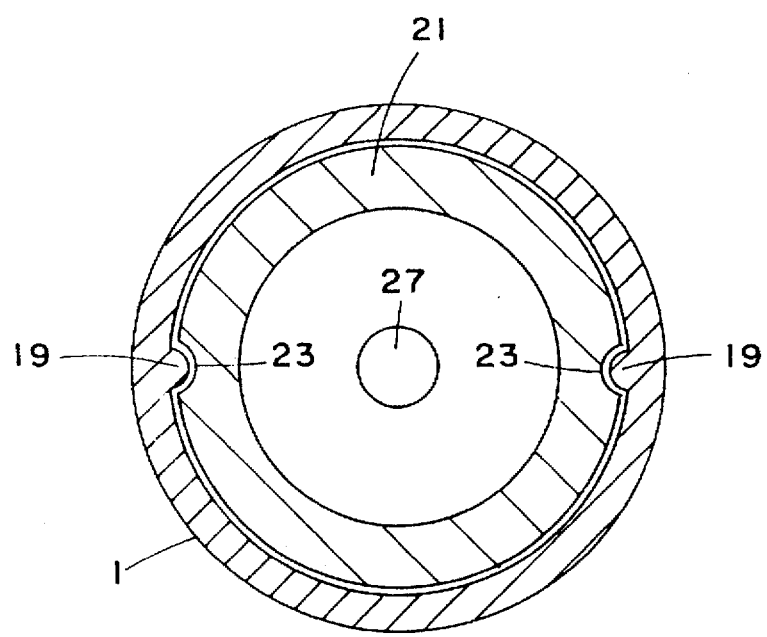
FIG. 2 is a cross-sectional view of the valve shown in FIG. 1, taken along line II—II.

As can better be seen in FIG. 2, the inner wall of housing 1 comprises two opposite, inwardly projecting elongate radial ribs 19.

Coaxially mounted within the housing 1 is an essentially cylindrical hollow float 21 having a confined volume 22 and formed on its outer wall with two longitudinal grooves 23, radially oriented, which grooves 23 respectively mate with ribs 19 of the housing 1, so as to prevent angular displacement of the float member 21 with respect to the housing 1.

The float member 21 has a screw-fitted base member 25 comprising a fluid inlet opening 27 and an annular groove 29 at its bottom face. An integrally formed sealed top end wall 31 has on its top surface a bearing surface 33 inclined with respect to the longitudinal axis of the float member 21, at an angle corresponding to the inclination of the rim 13.

The float member 21 further comprises a strip-like, flexible membrane 35 which is attached to the top surface of end wall 31 by an anchoring stud 37. Near the top end of the float member 21 there are provided ear outlet openings 38.

A coiled compression spring 39 has one end thereof bearing against an annular groove 29 of the base member 25 of the float member 21 and its other end, bearing on the annular ridge 8 of the base member 5 of the housing 1, thereby upwardly biasing the float member 21, which together with the inherent buoyancy of the float member, depending on the fuel level within the tank, apply upwardly-directed forces which tend to seal the slit-like outlet 15 by means of the strip-like membrane 35, which as can be seen in FIG. 1 is pressed against the rim 13 by the correspondingly inclined surface 33 of the float member 21.

Figure 3:
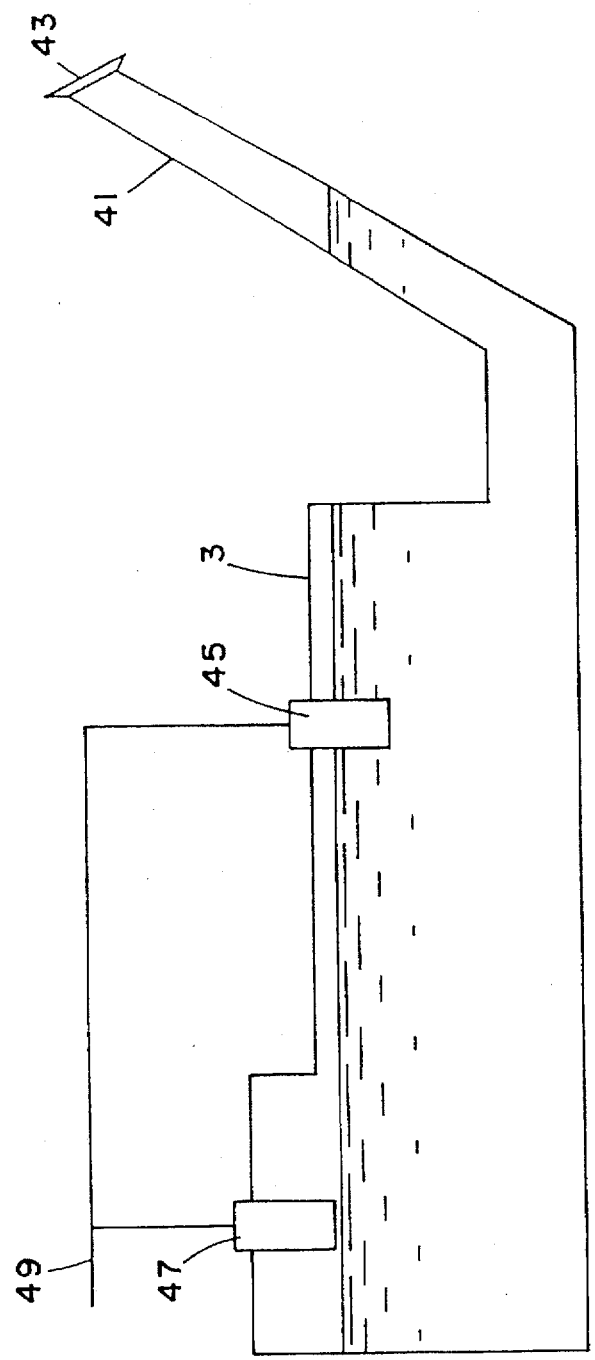
FIG. 3 is a schematic illustration of a fuel tank of a vehicle comprising an OFI valve and a roll over valve.

Reference is now made to FIG. 3 of the drawings, in which the fuel tank 3 comprises a fuel filling conduit 41 with a filling mouth 43, a roll-over valve 45 as known, per se, and an OFI valve 47, mounted at the topmost portion of the tank 3. Both the roll-over valve 45 and the OFI valve 47 are vented by a vent line 49 to the atmosphere or to a carbon canister (not shown).

Figure 4:
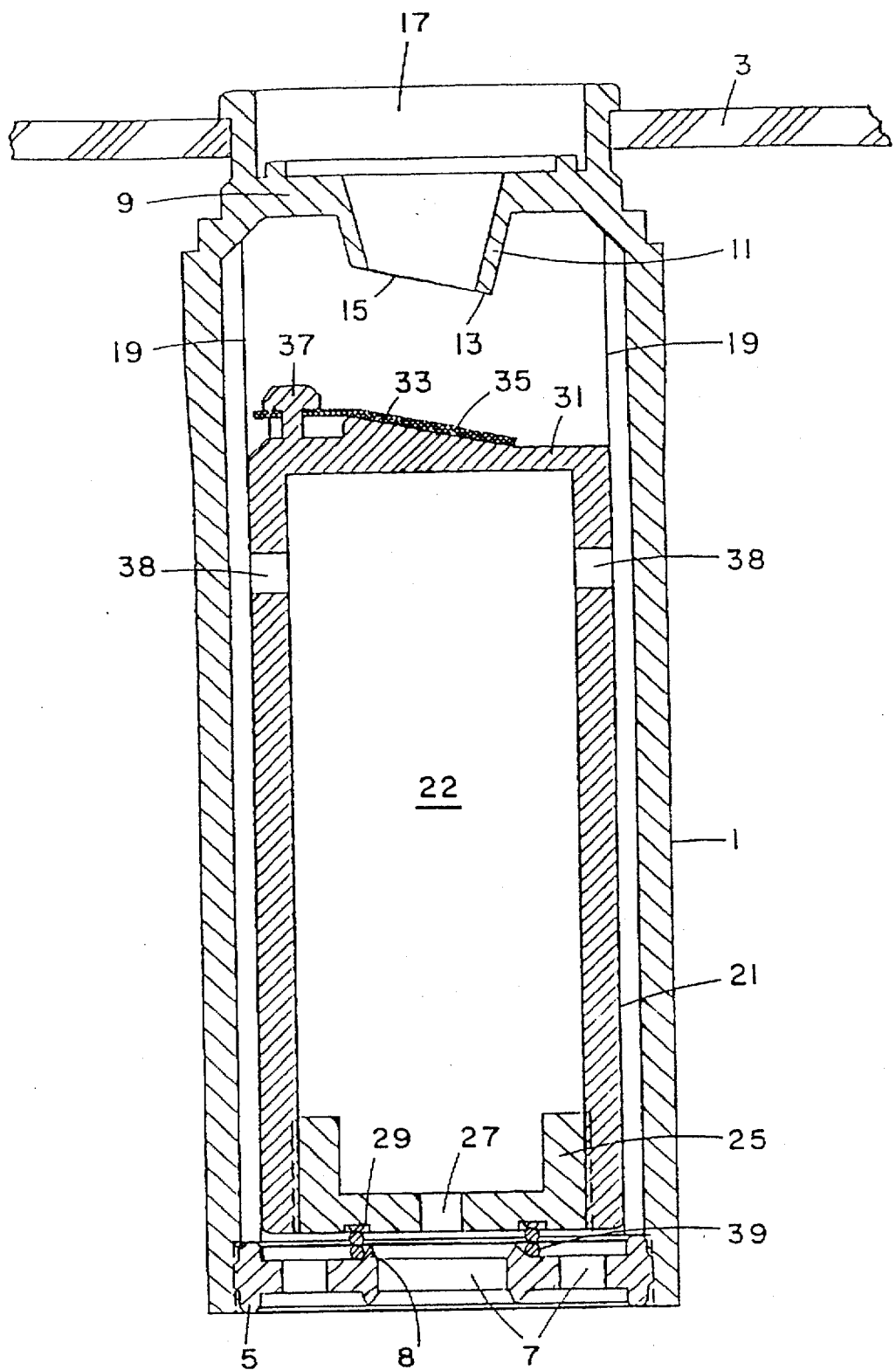
FIG. 4 is the same as FIG. 1 illustrating the OFI valve according to the present invention, the sealing means shown in an unsealed/open position.

In the normal condition of the valve, as illustrated in FIG. 4, when fuel level in the tank is below the OFI valve, gravity forces acting on the float member 21 overcome the biassing force of the compression spring 39 and the float member 21 descends to the bottom of housing 1, in the unsealed position shown in FIG. 4, wherein the outlet 15 is completely open and the fuel tank is vented.

When fuel is filled through filling mouth 43 of the tank 3, it is equally levelled in the tank and in the conduit 41, in accordance with the principal of connected vessels. However, in the event of over-filling above a predetermined level, fuel enters into the valve through inlet openings 7 of the housing 1, thereby gradually increasing the upwardly-directed buoyancy forces acting on the float member 21, which together with the biassing force of the spring 39 in the same direction, result in upwardly-directed displacement of the float member 21 to its sealing position shown in FIG. 1 of the drawing. It should be understood that the size and shape of the inlet openings 7 determine the rate at which fuel enters the float member 21 with openings 38 serving for air release.

In this way, it is ensured that upon over-fill of the tank, the OFI valve closes and on the one hand prevents escape of fuel through the valve outlet 17, and, on the other hand, causes fuel level within the conduit 41 to raise, whereby an automatic fuel filling spout will sense the raising fuel and stop its operation as known per se.

Fuel then penetrates into the confined volume 22 of the float member 21 via fluid inlet 27, allowing air to escape via air outlet apertures 38, gradually decreasing the buoyancy force acting on the float member 21. After a predetermined period of time, depending on the size of inlet aperture 27 and outlet apertures 38, fuel within the float member 21 reaches the same level as of the fuel in the housing 1 and in tank 3, that owing to the principal of connected vessels. As the fuel within the float member reaches a certain level, the buoyancy force acting on the float 21 is minimal and the gravity force overcomes the biasing force of spring 39, whereby the float member 21 drops down to the unsealing position of FIG. 4, again venting the tank.

However, if another attempt to fill the tank is made, then again the float member will seal the valve, as hereinabove explained, again allowing for a period of time to lapse before it opens. It was a found that a period of approximately 10 seconds is most suitable for preventing excessive fuel filling in a fuel tank of a vehicle.

As the fuel in the tank returns to its normal position (in case of a wave or roll-over) or as the fuel within the float member levels with the fuel in the housing (in case of over-filling), the increasing effect of gravity on the float member 21 overcomes the buoyancy forces and the biassing effect of the spring 39, resulting in the float member 21 moving downwardly to the unsealing position with progressive detachment of the membrane 35 from the rim 13 of outlet 15, thereby resulting in progressive opening of the venting outlet 17.

It should, however, be understood that in the event of a sudden rise of fuel level in the tank, e.g. as a result of a sudden change of acceleration, the float member 21 instantly rises to the sealing position of FIG. 1, preventing escape of fuel. The same occurs in case of roll-over of the vehicle, whereby the buoyancy forces increase and together with the biassing force of the spring, the float member 21 is urged to its sealing position.

Furthermore, during operation of the engine, fuel is consumed from the fuel tank and the valve enables its venting so as to prevent built-up of vacuum.

FIGS. 5 to 9 of the drawings illustrate another embodiment of the OFI according to the present invention.

Figure 5:
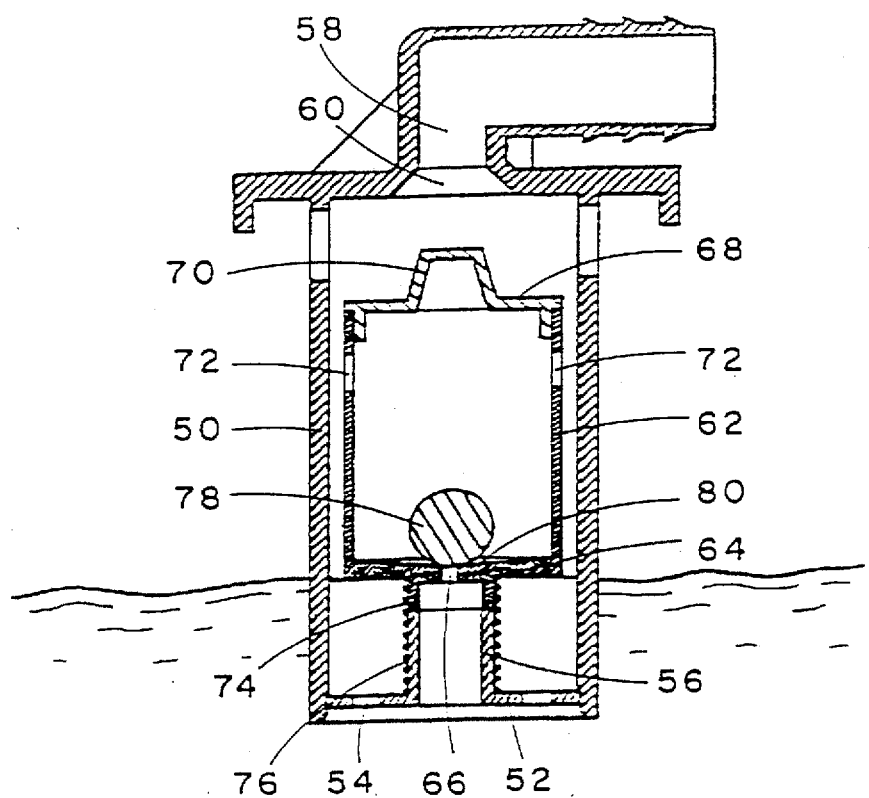
FIG. 5 is a longitudinal cross-sectional view of an OFI valve according to a preferred embodiment of the present invention, the valve in its sealed/closed position and the sealing means in an unsealed/open position.
Figure 6:
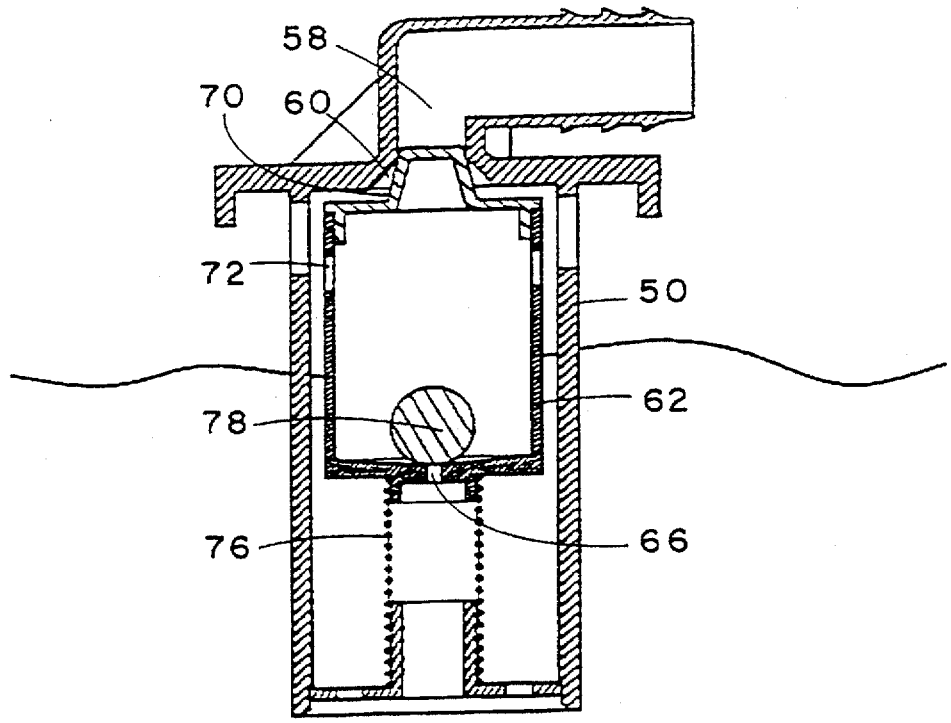
FIG. 6 is a cross-sectional view of the valve shown in FIG. 5, the valve in its sealed/closed position and the sealing means in a sealed/closed position.
Figure 7:
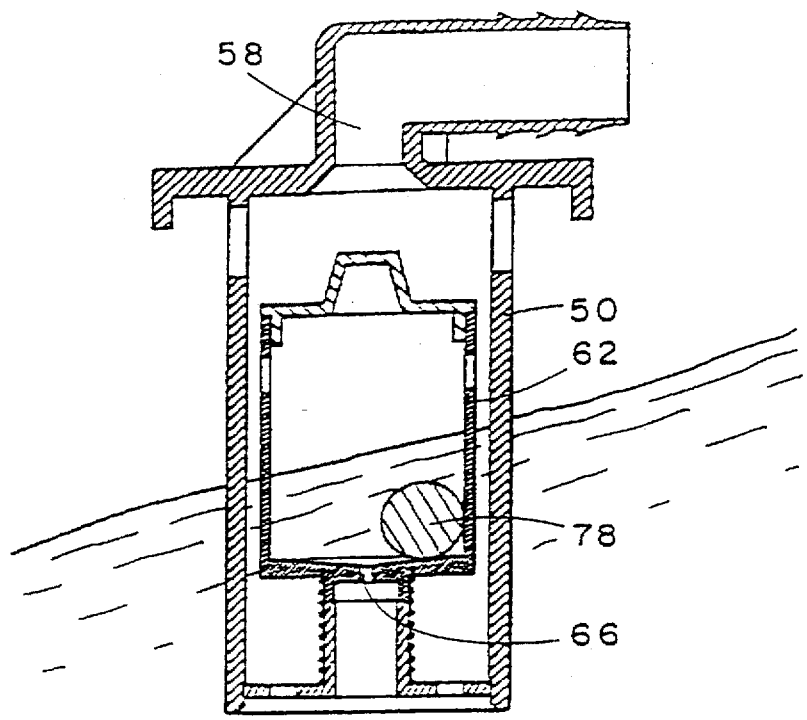
FIG. 7 is a cross-sectional view of the valve shown in FIG. 5, the valve in its unsealed/open position and the sealing means in an unsealed/open position.

Attention is first directed to FIGS. 5 to 7 illustrating a preferred embodiment in which housing 50 is adapted for installation at an uppermost portion of a fuel tank (not shown). The housing is fitted with a base member 52 comprising a plurality of inlet openings 54 and an upwardly projecting hollow boss 56. At an upper end of the housing 50 there is an opening 58 with a conical neck portion 60, the outlet 58 leading to a vent line (not shown), as known per se.

A hollow float member 62 is formed at a bottom base 64 with a concentric cylindric inlet opening 66 and a top base 68 with a concentric tapering projection 70, its lower portion being slightly wider than the neck portion 60 of the outlet 58.

The float member 62 further comprises near the top end outlet openings 72 and an annular projection 74 downward projecting from the bottom base 64.

A coiled compression spring 76 is mounted at one end thereof on the annular projection 74 and at an opposed end on the boss 56 projecting from the housing 50, thereby biasing the float member 62 in an upward direction (see FIG. 6)

A spherical mass 78 has a diameter essentially larger than the inlet 66, whereby when the spherical mass 78 rests over the inlet 66, the latter is sealed. As can be seen, the base 64 of the float member 50 has a conical-like cross-sectional shape having a predetermined inclination rate, whereby the spherical mass 78 remains in its sealing position until the tank is inclined or accelerated above a predetermined value.

When the fuel tank is filled, as seen in FIG. 6, the vehicle (not shown) is in rest over an essentially horizontal surface and the spherical mass 78 is positioned in its sealing position above fuel inlet 66 of the float 62. The fuel level increases within the housing 50 in accordance with the principal of connected vessels and the upwardly biasing force of the spring 76, together with the buoyancy of the float 62, apply upwardly-directed forces which displaces the float 60 resulting in engagement of the tapering projection 70 within the neck portion 60 of the outlet 58, thus sealing the outlet 58.

As already explained in connection with the previous embodiments, and with particular reference to FIG. 3, in this way it is ensured that upon over-fill of the tank, the OFI valve closes and prevents escape of fuel through the outlet 58 and causes fuel level within the conduit 41 (see FIG. 3) to raise, whereby an automatic fuel filling spout will stop its operation as known per se.

In FIG. 7, the OFI valve is illustrated in a position in which the vehicle is accelerating, e.g. leaving the fuel filling station after filling the fuel tank. In this situation, the spherical mass 78 is displaced from its sealing position, whereby fuel enters via inlet 66 into the cavity of the float member 62, entailing downward displacement of the float member to the position in which outlet 58 is unsealed, so as to vent fuel vapor from the fuel tank.

It should be noted that unlike with the previous embodiments, the downward displacement of the float member 52 occurs only as a result of displacement of the mass member and not as a function of time. The advantage of this arrangement is that attempts to fill the fuel tank over a predetermined level, will not be successful.

Figure 8:
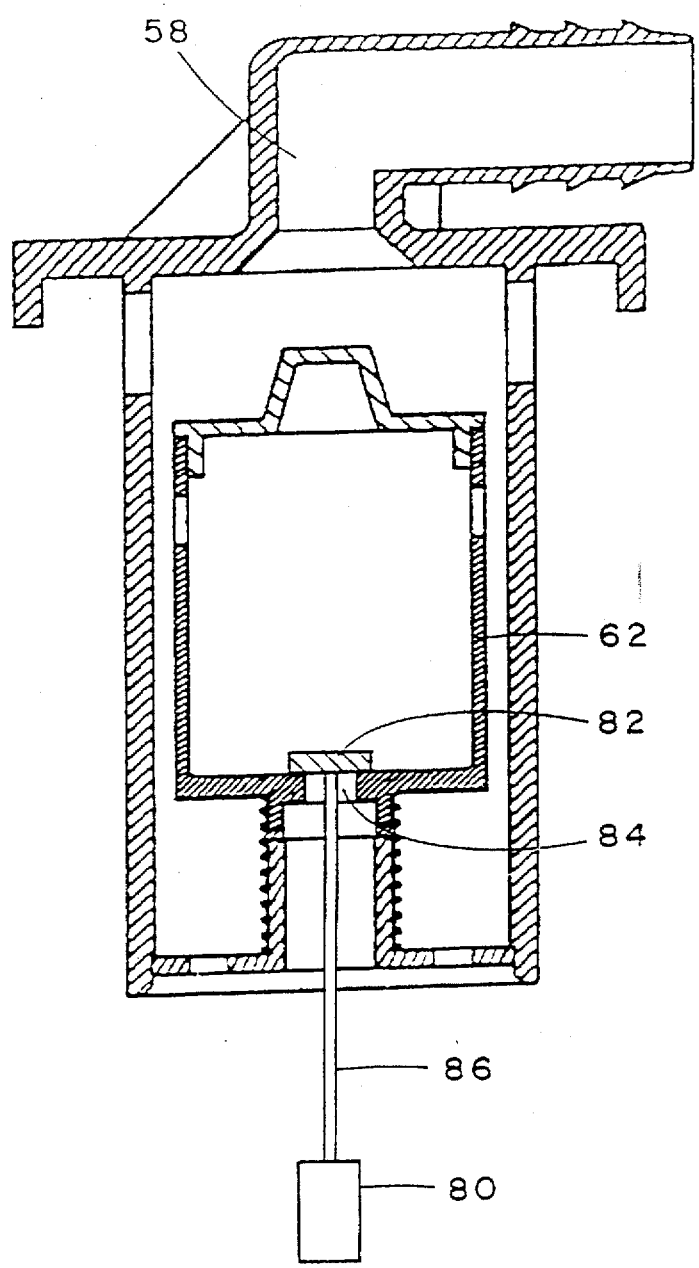
FIG. 8 is a longitudinal cross-sectional view of another application of an OFI valve according to the preferred embodiment of the present invention, the valve in its sealed/closed position and the sealing means in the unsealed/open position.
Figure 9:
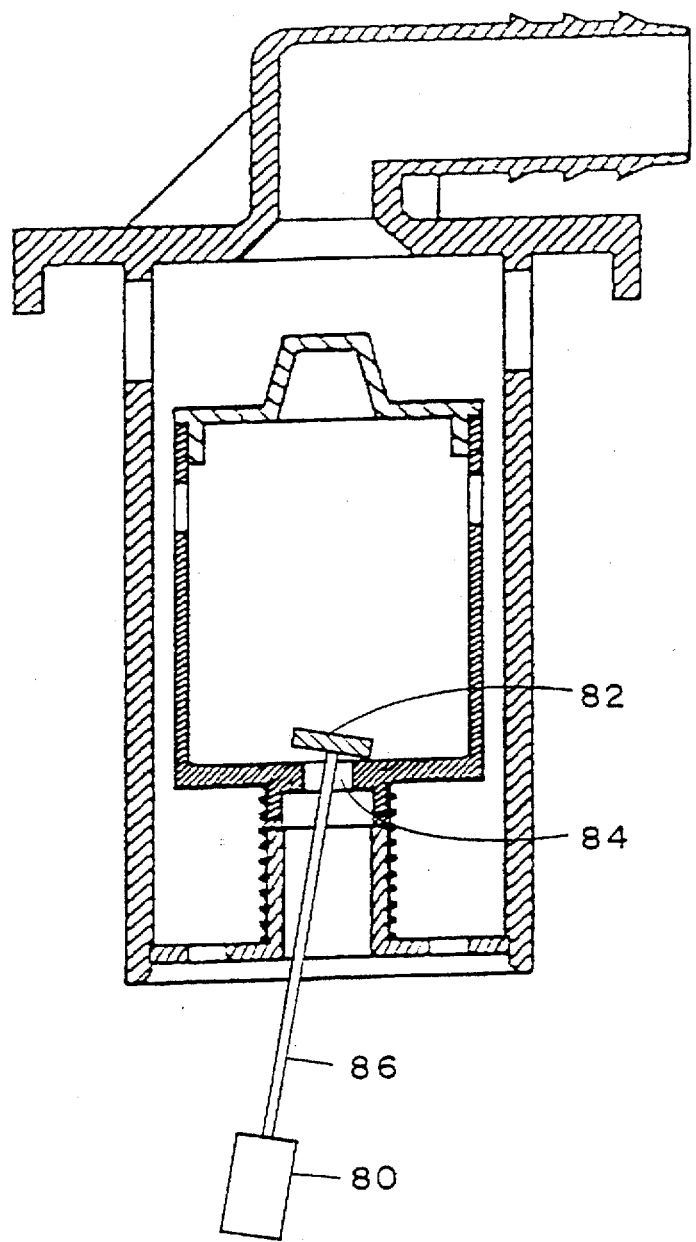
FIG. 9 is a cross-sectional view of the valve shown in FIG. 8, the valve in its unsealed/open position and the sealing means in an unsealed/open position.

Reference is now made to FIGS. 8 and 9, illustrating a modification of the present embodiment, wherein instead of the spherical mass, there is a mass 80 depending from a rigid sealing plate 82 being essentially larger than the fuel inlet 84. The mass 80 is attached to the sealing plate 82 by a rigid link 86 and the connections of the link 86 with the sealing plate 82 and with the mass 80 are also rigid, so that tilting of the mass 80 entails angular displacement of the sealing plate 82, whereby the inlet 84 is unsealed to allow fuel entry into the float member 62, as seen in FIG. 9.

The principle of the present application is similar to that illustrated with reference to FIGS. 5 to 7, wherein unsealing of the inlet is not time dependent but rather depends on acceleration or inclination of the vehicle.

We claim:

1. An over filling interdiction valve, fitted within a fluid tank, the valve comprising:

a housing furnished with a first fluid inlet at a bottom end thereof and a first fluid outlet at a top end thereof;

a float member located within said housing and being displaceable along its longitudinal axis between said first inlet and said first outlet; said float member comprising at a bottom end thereof a second fluid inlet and near a top end thereof a second fluid outlet; said bottom end of said float member being positioned relative to said first fluid inlet of said housing for immersion by liquid fuel entered into said housing via said first fluid inlet;

sealing means associated at a top end of said float member for sealing said first fluid outlet;

biasing means located within the housing and biasing the float member towards said first fluid outlet; said biasing means together with buoyancy forces of said entered liquid acting on the float member tend to urge said float member to a sealing position in which said sealing means sealingly engage with said first fluid outlet, gravity forces acting on said float member tend to displace the float member away from said first fluid outlet to an unsealed position; and a displaceable sealing member for at least partially blocking said second fluid inlet and for restricting fluid ingress through said second fluid inlet into the float member;

wherein raising of the fluid level in the tank raises the fluid level within said housing to urge the float member to said sealing position.

2. An over filling interdiction valve according to claim 1, wherein acceleration or inclination of the fluid tank above a predetermined value causes displacement of the seal to unseal said second fluid inlet, resulting in a rise of fluid within the float member which decreases the buoyancy of the float member, allowing said float member to overcome the biasing effect of said biasing means and move to the unsealed position.

3. An over filling interdiction valve according to claim 2, wherein said second fluid inlet is a cylindrical opening, and the displaceable sealing member is a spherical member displaceable within the float member and having a diameter larger than the diameter of the cylindrical opening, wherein the spherical member is adapted for sealing engagement of said opening.

4. An over filling interdiction valve according to claim 3, wherein said second fluid inlet extends from a nadir of a top surface of the bottom end of the float member, said top surface having a conical cross-section, the lowermost portion being adjacent the opening.

5. An over filling interdiction valve according to claim 4, wherein said top surface is a surface of revolution having a longitudinal axis coaxial with a longitudinal axis of the float member.

6. An over filling interdiction valve according to claim 3, wherein the minimal rate of inclination required for displacing the spherical member is in the range of 3° to 20°.

7. An over filling interdiction valve according to claim 6, wherein the minimal rate of inclination is approximately 8°.

8. An over filling interdiction valve according to claim 1, wherein the displaceable sealing member is constituted by a mass depending from a rigid sealing member adapted for sealing the second fluid inlet; the mass being rigidly suspended from the sealing member, whereby angular displacement of the mass entails angular displacement of the rigid sealing member.

9. An over filling interdiction valve according to claim 1, wherein said housing and said float member are substantially coaxial and wherein said float member is prevented from rotating within said housing.

10. An over filling interdiction valve according to claim 1, wherein said biassing means is a compression spring bearing at a bottom end thereof against a top surface of a base member of said housing, and at a top end thereof against a bottom surface of a base member of said float member.

11. An over filling interdiction valve according to claim 1, wherein said first fluid outlet has a neck portion with a wider lower portion adapted for sealingly receiving a tapering projection from the top surface of the float member, whereby engagement of the tapering portion within the neck portion seals said first fluid outlet.

* * * * *